United States Patent
Pannell et al.

(10) Patent No.: US 8,715,758 B2
(45) Date of Patent: May 6, 2014

(54) BITE SIZED REFRIGERATED YOGURT PRODUCTS

(75) Inventors: Lisa K. Pannell, St. Louis Park, MN (US); Logan Merkwae, Eden Prairie, MN (US)

(73) Assignee: General Mills, Inc., Minneapolis, MN (US)

( * ) Notice: Subject to any disclaimer, the term of this patent is extended or adjusted under 35 U.S.C. 154(b) by 229 days.

(21) Appl. No.: 13/112,149

(22) Filed: May 20, 2011

(65) Prior Publication Data

US 2011/0287147 A1     Nov. 24, 2011

Related U.S. Application Data

(60) Provisional application No. 61/346,585, filed on May 20, 2010.

(51) Int. Cl.
*A23L 1/00* (2006.01)
*A23B 7/16* (2006.01)

(52) U.S. Cl.
USPC .................. 426/302; 426/306; 426/307

(58) Field of Classification Search
USPC ................ 426/293, 302, 303, 306, 307
See application file for complete search history.

(56) References Cited

U.S. PATENT DOCUMENTS

| | | | |
|---|---|---|---|
| 4,952,414 A | 8/1990 | Kaufman et al. | |
| 4,971,810 A | 11/1990 | Hoyda et al. | |
| 4,976,978 A * | 12/1990 | Schubert | 426/295 |
| 5,573,793 A | 11/1996 | Saintain | |
| 5,820,903 A | 10/1998 | Fleury et al. | |
| 6,235,320 B1 | 5/2001 | Daravingas et al. | |
| 6,399,122 B2 | 6/2002 | Vandeweghe et al. | |
| 6,740,344 B2 | 5/2004 | Murphy et al. | |
| 7,033,634 B2 | 4/2006 | Engesser et al. | |
| 7,232,584 B2 * | 6/2007 | Rabinovitch et al. | 426/306 |
| 2002/0146500 A1 | 10/2002 | Smith | |
| 2003/0175385 A1 * | 9/2003 | Helferich et al. | 426/91 |
| 2003/0175388 A1 | 9/2003 | Napolitano et al. | |
| 2005/0255192 A1 | 11/2005 | Chaudhry et al. | |
| 2006/0165844 A1 * | 7/2006 | O'Sullivan et al. | 426/34 |
| 2007/0178200 A1 * | 8/2007 | Morando | 426/306 |
| 2007/0178213 A1 | 8/2007 | Ketchmark et al. | |
| 2008/0050484 A1 | 2/2008 | Kijowski et al. | |
| 2008/0089991 A1 | 4/2008 | Cox et al. | |
| 2009/0130265 A1 | 5/2009 | Leas et al. | |

FOREIGN PATENT DOCUMENTS

EP     1378174     1/2004

OTHER PUBLICATIONS http://caloriecount.about.com/forums/foods/freeze-yogurt-turn-frozen, "If You Freeze Yogurt Will It Turn Into Frozen Yogurt" Blog, pp. 3, Dec. 6, 2007.*

* cited by examiner

*Primary Examiner* — Jyoti Chawla
(74) *Attorney, Agent, or Firm* — Annette M. Frawley; Dale A. Bjorkman

(57) ABSTRACT

Refrigerated yogurt products of small size suitable for eating with the fingers are prepared by providing a frozen yogurt composition in individual serving portions and coating the frozen yogurt portions with a fat based coating that is a solid at 45° F., thereby completely enveloping the frozen yogurt portions. The coated frozen yogurt portion is allowed to thaw to form a refrigerated yogurt product and is stored at a temperature of from about 32° F. to about 45° F. The yogurt composition has a final viscosity of from about 35,000 to about 150,000 cP at 4° C., and has a total solids content of at least about 22% and/or exhibits a viscosity reduction at 45° F. of less than 10% after two freeze/thaw cycles. Methods and products are described.

19 Claims, 1 Drawing Sheet

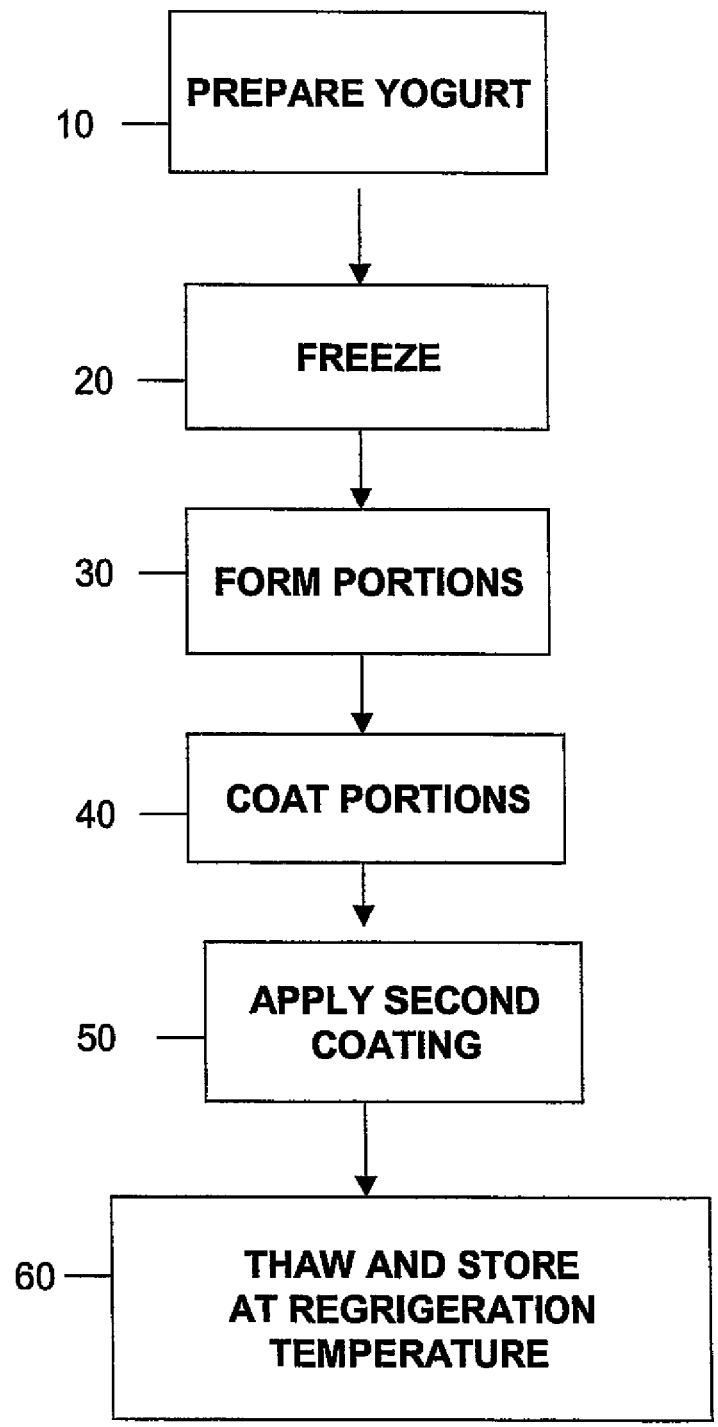

BITE SIZED REFRIGERATED YOGURT PRODUCTS

REFERENCE TO RELATED APPLICATIONS

This application claims the benefit of priority under 35 U.S.C. 119(e)(1) of a provisional patent application Ser. No. 61/346,585, filed May 20, 2010, which is incorporated herein by reference in its entirety.

FIELD OF THE INVENTION

The present invention relates to refrigerated yogurt products. More specifically, this invention relates to refrigerated yogurt products of small size suitable for eating with the fingers.

BACKGROUND OF THE INVENTION

Fermented dairy products, such as yogurt, typically refer to compositions produced by culturing (fermenting) one or more dairy ingredients, also sometimes referred to as a dairy base, with a bacterial culture that contains the lactic acid-producing bacteria, such as *Lactobacillus bulgaricus* and/or *Streptococcus thermophilus*. Such products are available in a wide variety of styles and formulations.

For example, U.S. Pat. No. 4,971,810 (Hoyda et al.) discloses fiber fortified yogurt products; U.S. Pat. No. 4,952,414 (Kaufman et al.) discloses yogurt with cereal pieces; U.S. Pat. No. 6,235,320 (Daravingas et al.) discloses multi-layered, colored yogurt products; U.S. Pat. No. 7,033,634 (Engesser et al.) discloses aerated or whipped yogurt products and describes that a hydrated emulsifier blend can be added to a cultured yogurt post fermentation; U.S. Pub. No. 2005/0255192 (Chaudhry et al.) discloses a method for making cultured dairy products with decreased fermentation times; and U.S. patent application titled "NOVEL AERATED MILK COMPOSITIONS," filed Feb. 1, 2006, by Ketchmark et al., U.S. Ser. No. 11/324,550 discloses aerated milk compositions such as yogurt.

Additionally, frozen yogurt products are available in the marketplace that can be consumed with the hands, such as Yoplait parfait bites product and various frozen yogurt novelties.

Consumers enjoy convenient, portable ways to eat healthful products such as yogurt, without the need to use a spoon. An example of such a product is Go-GURT® Portable Lowfat Yogurt, which is a yogurt product provided in a tube for portable consumption. U.S. Patent Application Publication No. 2008/0089991 describes gelled food products such as yogurt or pudding products that are hand-holdable. These products contain a hydrocolloid ingredient that is present in an amount such that the gelled dairy composition has a Gel Strength Value of at least 100 grams. See claim 1 of the published application.

Confectionery products comprising a high water activity component such as yogurt are described in U.S. Patent Application Publication No. 2008/0050484. This application notes the problem of dissolution of the moisture sensitive confectionery materials by the high water activity components, and states that this can be prevented by use of moisture barriers. In the described method, the shell is first molded, a moisture barrier is deposited onto the shell, and then the high water activity material is deposited into the molded shell. See paragraphs [0030]-[0034]. An alternative enrobing process whereby the high water activity material is first formed into a desired shape and subsequently hermetically covered with at least one layer of low water activity material is described. The application states that "[f]orming of the high water activity material may involve a set time, or cooling step in order to give the material a consistency appropriate for cutting resp. enrobing and coating." See paragraph [0044].

Patent application EP1378174A1 describes a high water food product with an edible casing containing a moist filling, which is preferably a yogurt based filling. The described product is prepared by first forming the casing, then pouring a liquid or viscous filling material into the casing, and then sealing the casing. See paragraph [0019]. U.S. Pat. No. 5,573,793 to Saintain describes a cookie or chocolate shell food product having a filling based on a dairy product. The filling is fermented and contains live lactic acid bacteria. The filling has a water activity of between 0.75 and 0.81.

There is a continuing need to provide new and improved yogurt products, especially having characteristics that are appealing to consumers.

SUMMARY OF THE INVENTION

A method is provided for preparing a refrigerated yogurt product of small size suitable for eating with the fingers. In the method, a yogurt composition is provided in individual serving portions in the frozen or partially frozen state. These individual serving portions are coated with a fat based coating that is a solid at 45° F., thereby completely enveloping the frozen yogurt portions. The coated frozen yogurt portions are allowed to thaw to form a refrigerated yogurt product and is stored at a temperature of from about 32° F. to about 45° F. In an embodiment, the yogurt composition of the refrigerated yogurt product has a total solids content of at least about 22% and a final apparent viscosity of from about 35,000 to about 150,000 cP at 4° C. In another embodiment, the yogurt composition of the refrigerated yogurt product exhibits a viscosity reduction at 45° F. of less than 10% after two freeze/thaw cycles.

In an embodiment of the present invention, a refrigerated yogurt product of small size suitable for eating with the fingers is provided. This refrigerated yogurt product comprises a yogurt composition in a portion of from about 2 to about 12 grams, and more preferably from about 4 to about 8 grams, that has been coated with at least one a fat based coating, thereby completely enveloping the yogurt portion. The yogurt composition of the refrigerated yogurt product has an apparent viscosity of from about 35,000 to about 150,000 cP at 4° C. and exhibits a viscosity reduction at 45° F. of less than 10% after two freeze/thaw cycles. In another embodiment, the yogurt composition of the refrigerated yogurt product has a total solids content of at least about 22%, and has an apparent viscosity of from about 35,000 to about 150,000 cP at 4° C. In another embodiment, the yogurt composition of the refrigerated yogurt product has a total solids content of from about 22 to about 30 percent and has an apparent viscosity of from about 35,000 to about 150,000 cP at 4° C. The fat based coating is a solid at 45° F.; and the refrigerated yogurt product is stored at a temperature of from about 32° F. to about 45° F.

The present method and product provide the consumer with a convenient, portable way to eat yogurt without a spoon that affords a unique yogurt consumption experience. The yogurt composition in the center of the refrigerated yogurt product is actual yogurt, meaning that it meets the standard of identity of yogurt comprising live cultures. Additionally, the yogurt composition in the center of the refrigerated yogurt product can have the expected consistency and mouthfeel of a yogurt. The center of the product can be creamy and provide the expected viscosity of the target product, whether that can be an ordinary yogurt, a Greek style yogurt, a strained or concentrated yogurt, a whipped yogurt, and so forth. In other examples, the center might be other fresh, cultured dairy product, such as fromage frais, quark or farmer's cheese.

The present invention solves the problem of manufacture of providing small size yogurt products that are suitable for eating with the fingers, wherein a true yogurt eating experience is provided by the product. By providing a yogurt composition that will survive freeze cycles with minimal loss of viscosity, the final product achieves the unique desired organoleptic experience. In an embodiment of the present invention the yogurt product achieves the desired final organoleptic properties by the yogurt composition having a total solids content of at least about 22%, where at least one third of the solids content is from the milk solids (protein, lactose, fat, ash), and preferably more than half of the solids are from milk. In preferred embodiments, at least 10% of the solids content is from soluble solids (such as monosaccharides), and more preferably at least 14% of the solids content is from soluble solids. Yogurt compositions having a solids content of less than about 22% have been observed to exhibit moisture migration failure, thereby possessing less than desirable shelf life.

In a preferred embodiment, the yogurt has a fat content of 1% to 6%. Non-fat filling and higher fat fillings may be used in alternative embodiments. Yogurt compositions comprising at least some fat are preferred for taste and texture. However, lower fat compositions are preferred for better nutrition.

Additionally, the refrigerated yogurt product provides a unique organoleptic experience by providing an outside coating layer that creates a solid shell consumption experience, with a creamy and/or liquid inside. In an embodiment of the present invention the refrigerated yogurt product delivers a crunchy outer shell consumption experience by incorporating particulate inclusions, such as granola, in or on the coating layer. The combination of particulate inclusions on the outside along with a soft and creamy filling on the inside provides the consumer a dual texture as well as the feeling of a hearty, satisfying snack. In another embodiment of the present invention the refrigerated yogurt product delivers a cracking outer shell consumption experience by use of a durable outer shell, such as a hard chocolate or fat coating layer.

The present refrigerated yogurt product provides organoleptic experience that is quite different from shelf stable yogurt snacks such as yogurt covered raisins, yogurt filled grain bars, etc., because the present product delivers the texture of yogurt (as otherwise must be served in a container) along with the health benefits of yogurt, giving consumers a new eating occasion.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 1 is a flowchart of a process for manufacture of the refrigerated yogurt product of the present invention.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Turning now to FIG. 1, an embodiment of the process for manufacture of the refrigerated yogurt product of the present invention is shown as a flowchart. In the first step 10, a yogurt composition is prepared.

As used herein, the term "yogurt" includes, but is not limited to, all of those food products meeting the definition as set forth in the U.S. Food and Drug Administration Code of Federal Regulations (CFR) Title 21 Section 131.200, 131.203, and 131.206.

In general, the yogurt can be made from a fermentable dairy base and bacterial culture. In addition, a yogurt composition may include a gel-forming hydrocolloid component and, optionally, one or more additives.

Dairy bases for making a yogurt are well known and are described in, e.g., U.S. Pat. No. 4,971,810 (Hoyda et al.); U.S. Pat. No. 5,820,903 (Fleury et al.); U.S. Pat. No. 6,235,320 (Daravingas et al.); U.S. Pat. No. 6,399,122 (Vandeweghe et al.); U.S. Pat. No. 6,740,344 (Murphy et al.); and U.S. Pub. No. 2005/0255192 (Chaudhry et al.). In general, a dairy base includes at least one fermentable dairy ingredient. A fermentable dairy ingredient can include raw milk or a combination of whole milk, skim milk, condensed milk, dry milk (for example, dry milk solids non-fat, or MSNF). Preferably, the fermentable dairy ingredient is composed of bovine milk. However, if desired other milks can be used as a partial or whole substitute for bovine milk, such as camel, goat, sheep or equine milk. The fermentable dairy ingredient may also comprise grade A whey, cream, and/or such other milk fraction ingredients as buttermilk, whey, lactose, lactalbumins, lactoglobulins, or whey modified by partial or complete removal of lactose and/or minerals, and/or other dairy ingredients to increase the nonfat solids content, which are blended to provide the desired fat and solids content. If desired, the dairy base can include a filled milk component, such as a milk ingredient having a portion supplied by a non-milk ingredient (for example, oil or soybean milk).

In exemplary embodiments, a yogurt composition of the refrigerated yogurt product has a fat content in the range of from 0 to 12 weight percent based on the total weight of the yogurt composition. With respect to exemplary embodiments of the refrigerated yogurt product, the fat content is in the range of from 0.5 to 10 weight percent, preferably from 0.5 to 5 weight percent, from 0.5 to 3 weight percent, and even more preferably about 1% weight percent based on the total weight of the yogurt composition.

In embodiments of the present invention, the refrigerated yogurt product has a total solids content of at least about 22% and a milk solids content of greater than 38 weight percent based on total solids content, and has fat content of from about 0.5% to about 3% and soluble solids content (sucrose and lactose) of from about 9 to about 13%. In an embodiment, the yogurt composition of the refrigerated yogurt product comprises from about 50% to about 80% milk solids. This formula is fermented and used without a concentration step.

In another embodiment of the present invention, the refrigerated yogurt product has a total solids content of from about 24% to about 35%, with milk solids being from about 50 to 70% of the total solids, soluble solids content of from about 7 to about 11%, and fat content of from about 1 to about 4%. This formula is also fermented and used without a concentration step.

In another embodiment of the present invention, the yogurt is prepared and fermented, with a subsequent concentration step after fermentation. In an embodiment, a finished filling (after concentration step) is provided with total solids content of from about 40 to about 60%, with milk solids being from about 30 to about 50% of the total solids, fat content of from about 1 to about 3% and the soluble solids of from about 10 to about 14%.

In addition, dairy bases typically include sweeteners, flavor ingredient(s), process viscosity modifier(s), vitamin(s), nutrient(s), combinations of these, and the like. Other ingredients that may be included are gel-forming additives, stabilizers, sequestrants, etc.

Examples of suitable sweeteners include one or more nutritive carbohydrate sweetening agents. Exemplary nutritive sweetening agents include, but are not limited to, sucrose, liquid sucrose, high fructose corn syrup, dextrose, liquid dextrose, various DE corn syrups, corn syrup solids, beet or cane sugar, invert sugar (in paste or syrup form), brown sugar, refiner's syrup, molasses, fructose, fructose syrup, maltose, maltose syrup, dried maltose syrup, malt extract, dried malt extract, malt syrup, dried malt syrup, honey, maple sugar, and mixtures thereof. In some embodiments, particularly in low fat and/or low calorie variations, the dairy base can comprise a high potency non-nutritive carbohydrate sweetening agent. Exemplary high potency sweetening agents include aspartame, sucralose, acesulfame potassium, saccharin, cyclamates, thaumatin, tagatose, rebaudioside, stevia, and mixtures thereof. In exemplary embodiments, the sweetener is typically present in an amount of from 0 to 20 weight percent, preferably 12 to 17 weight percent based on the total weight of the yogurt composition.

In exemplary embodiments, a process viscosity modifier can be present in an amount of from 0.5 to 3 weight percent, preferably 1 to 2 weight percent based on the total weight of the yogurt composition. An exemplary process viscosity modifier can be commercially obtained from National Starch (Bridgewater, N.J.) under the tradename THERMTEX®. In embodiments of the present invention, the yogurt can contain 0 to 3% starch, 0 to 1% gelatin, and 0 to 0.5% LM pectin. An example of a suitable gelatin is 220 bloom. An exemplary non-dairy, gel-forming hydrocolloid ingredient for use in the present invention can include gelatin, agar, alginate, carrageenan, pectin, starch, xanthan/locust bean gum blend, gellan gum, konjac gum, combinations of these, and the like. It is noted that some gel-forming hydrocolloid ingredients (e.g., starch) can have structural modifications that can influence the gel-forming ability of other hydrocolloids. Examples of useful stabilizers and thickeners such as starch, gelatin, pectin, agar, carrageenan, gellan gum, xanthan gum, carboxy methyl cellulose (CMC), sodium alginate, hydroxy propyl, methyl cellulose, and mixtures thereof. In some embodiments, the dairy base can comprise a bovine, porcine, or piscine gelatin. A bovine gelatin in the range of about 200 to about 250 bloom strength can be used; also, Type B bovine gelatin in the range of about 220 to about 230 bloom strength is suitable.

When included, stabilizers or thickeners can be included in an amount sufficient to provide a desired viscosity to the yogurt composition, such that the yogurt composition can be processed (e.g., pumped) through equipment during formulation of the inventive compositions. Additionally, stabilizers can be provided to assist in providing freeze/thaw stability to the yogurt.

Any bacterial culture useful in making yogurt compositions for consumption can be used with the dairy base composition. Such bacterial culture(s) are live and active and are well known. An exemplary bacterial culture can include any microorganism suitable for lactic fermentation such as *Lactobacillus* sp., *Streptococcus* sp., combinations of these, and the like. More specifically, a bacterial culture can include *Lactobacillus delbrueckii* subspecies *bulgaricus, Streptococcus thermophilus, Streptococcus salivarius* ssp *thermophilus, Lactobacillus lactis, Lactobacillus casei, Lactobacillus acidophilus, Bifidobacterium lactis, Bifodobacterium bifidus, Lactococcus cremoris, Lactococcus lactis, Lactococcus lactis* ss *diacetylactis*, combinations of these, and the like. A variety of synonyms exist for the term "bacterial culture." These synonyms include, for example, live culture, active culture, live and active culture, starter culture, and the like.

The yogurt composition is formulated so that the composition of the final refrigerated yogurt product has a viscosity of from about 35,000 to about 150,000 cP at 4° C. In an embodiment of the present invention, the final viscosity of the yogurt composition of the refrigerated yogurt product is from about 60,000 to about 120,000 cP at 4° C. In embodiments of the present invention, the yogurt composition may be a whipped or gelled yogurt, provided that the yogurt is sufficiently stabilized to maintain its texture once frozen and thawed.

In embodiments of the present invention, the yogurt composition has a pH in the range of about 4.35 to about 4.85, preferably from about 4.5 to about 4.7, and most preferably about 4.60

Optionally, the yogurt composition can further include a variety of adjuvant materials to modify the nutritional, organoleptic, flavor, color, or other properties of the composition. For example, the yogurt composition can additionally include synthetic and/or natural flavorings, and/or coloring agents can be used in the compositions of the invention. Any flavors typically included in yogurt compositions can be used in accordance with the teachings of the invention. Also, flavor materials and particulates, such as fruit and fruit extracts, nuts, chips, and the like, can be added to the yogurt compositions as desired. The flavoring agents can be used in amounts in the range of about 0.01 to about 3%. Coloring agents can be used in amounts in the range of about 0.01 to 0.2% (all percentages based upon total weight of the yogurt composition).

When included, fruit and fruit extracts (e.g., sauces or purees) can comprise about 1% to about 40%, preferably from about 5% to 15% of the yogurt composition. The fruit component can be admixed with the emulsifier prior to addition to the first dairy base, or can be added as a separate component, as desired.

The thus provided yogurt composition is frozen in freezing step 20, whereby the temperature of the yogurt composition is lowered to a level sufficient to thicken the yogurt composition so that it retains its shape in an unsupported manner for a time sufficient to be coated. Preferably, the temperature of the yogurt composition is lowered to a temperature of from about −10° F. to −15° F. The yogurt composition can be frozen in any appropriate manner, such as holding batches of yogurt at a temperature below 32° F., such as a temperature of from about −40° F. to about 10° F., and preferably from about −35° F. to about −20° F. Optionally, the yogurt composition can be frozen in a continuous process by pumping through a cooling array so that the temperature of the yogurt is lowered to a level sufficient to thicken the yogurt composition as described above. In an embodiment of the present invention, the frozen yogurt composition has a consistency at the time of coating much like soft serve ice cream or, in another embodiment, much like regular "hard pack" ice cream.

The frozen yogurt composition is portioned in a portion forming step 30. Preferably, the portions are sized for individual servings, and more preferably are sized for individual "bite sized" portions. In an embodiment, the frozen yogurt portions are from about 2 to about 6 grams. In another embodiment, the portions are sized for individual servings as "multiple bite" portions. Examples of this embodiment provide frozen yogurt portions in sizes of from about 6 to about 25 grams.

The frozen yogurt portions may be of any appropriate shape, such as a generally spherical shape or a generally cylindrical shape. It has been found that rounded shapes are preferable, because such shapes facilitate even coating of the coating composition to completely envelop the yogurt portion. Thus, while for example cubic shapes are envisioned as an embodiment of the present invention, the sharp edges and corners of such a product present added challenges in making a coated yogurt product without defects in the coating that permit leakage of the yogurt. In an embodiment of the present invention, the frozen yogurt portions range from about 1 cm to about 4 cm diameter. The 1 cm diameter frozen yogurt portions would be considered to be very small, and would therefore provide very small volume or "payload" of yogurt. The 4 cm diameter frozen yogurt portions would be considered to be very large as an individual bite-size snack, and would likely require more than one bite to eat the product. In a preferred embodiment, the frozen yogurt portion has a half sphere shape with a diameter of from about 2.0 to about 3.0 cm diameter and having a height of from about 1.0 to about 2.0 cm. A particularly preferred size is a sphere with a diameter of from about 2.0 to about 2.5 cm.

In an embodiment of the present invention, the yogurt composition is formed into pieces of a size appropriate to be consumed in multiple bites. Examples of this embodiment include pieces formed into elongated shapes, such as a stick or a bar. Such an embodiment would have a cross-sectional shape of a circle, oval, octagon, rectangle, etc, having a diameter or width of from about 1 to about 4 cm, and a length appropriate to provide the total serving size, such as from about 6 to about 15 cm. In an embodiment, the frozen yogurt portions are from about 2 to about 12 grams.

The yogurt portions may be formed in any suitable manner, for example by shaping the frozen yogurt composition or by extrusion of the frozen yogurt directly out of the freezing unit and separating the yogurt extrudate into individual serving portions.

Optionally, the order of freezing step 20 and portion forming step 30 are reversed or occur simultaneously. Thus, in an embodiment of the present process, the yogurt portions may be formed by depositing the unfrozen yogurt or partially frozen yogurt in a mold and freezing the yogurt sufficiently for the yogurt to maintain its shape for coating purposes. If the yogurt is unfrozen at the time that it is placed in the mold, it will conform to the shape of the mold. Thus, the mold may have for example a generally half-spherical shape or a generally half-cylindrical shape, which shape will be reflected in the shape of the yogurt composition. In embodiments wherein the yogurt is partially frozen, a portion of the yogurt composition may be manipulated during the further freezing process, e.g. by being deposited on a moving belt and allowed to roll, to provide the desired shape. The yogurt may be frozen by any appropriate technique, such as by direct contact (e.g. dropping pieces into liquid nitrogen bath or blast freezer with cold air, or indirect contact (e.g. through shelf freezer). Direct contact is preferable, because it is faster freezing, forming smaller ice crystals.

The formed portions of the yogurt composition are then coated in coating step 40.

The coating properties optimally lead to minimal drip time, short setting time, and good adherence to the yogurt center without cracks or other discontinuous areas in the coating. The set time should be short enough for efficient manufacture, but long enough to allow the granola particles on the exterior to be applied before the coating solidifies. The coating also needs to provide a firm structure, which will both protect the thawed center and allow the product to be neatly consumed with one's hands. Finally, the coating should provide a pleasant taste and non-greasy texture in the mouth.

The coating composition for coating the frozen yogurt portion preferably is a fat based coating made mostly out of hydrogenated fat so it is solid at room temperature. The coating serves to encase the yogurt filling. Preferably, the coating composition is formulated to keep any particulate inclusions in the coating, such as granola, crunchy. To keep the particulate inclusions crunchy, the coating compositions typically are made almost entirely of fat based ingredients (due to low water activity). The fat based coating would preferably be based on blends of lauric fats (such as coconut oil, palm kernel oil or fractionated coconut or palm kernel oil) and non-lauric fats, (such as cocoa butter, partially hydrogenated vegetable oil (from soybean, palm, cottonseed or rapeseed) or fractionated oils). The partially hydrogenated oils have the disadvantage of high trans fatty acid content, and therefore the fractionated oils are preferred for the non-lauric fat component. The optimum blend will have the desired brittleness provided by the lauric component, and the needed elasticity provided by the non-lauric component. Optionally, lower fat coatings may be used if it is not crucial to keep the outer coating/particulates crunchy or if the particulate is itself fat based. The coating can be made of various ingredients and levels of fat as long as it can be heated to form a liquid, is solid at refrigerated temperatures and can completely encase the yogurt. Typical coating composition will be from 30-35% fat and 40 to 50% sugar. Flavor can optionally be added to the coating. In an embodiment of the present invention, the coating is made from chocolate. A typical dark sweet chocolate coating would contain 35-40% chocolate liquor, 40-45% sugar, and 35-40% fat, while a typical milk chocolate coating would contain 10% liquor, 10% milk solids, 45-55% sugar, and 30-40% fat.

A preferred coating comprises coconut oil and palm kernel oil in a ratio for from about 60/40 to about 80/20, and more preferably at a ratio of about 70/30. Coatings prepared outside of this range are less preferred due to processing and performance challenges. For example, when the ratio of coconut oil to palm kernel oil is higher than 80/20, the coating sets too slowly for optimal production processes. When the ratio of coconut oil to palm kernel oil is lower than 60/40, the resulting coating tends to crack, and also sets so quickly that there isn't time for enough external particle inclusions such as granola to stick.

In an embodiment of the present invention, the coating consists of fat, sugar, flavoring and an emulsifier. The fat content will be a mixture of liquid and solid fat. Solid fat content can be, for example, partially hydrogenated coconut oil, palm oil, fractionated palm oil, interesterified palm oil, cocoa butter, or other solid vegetable fats. Liquid fat content can be, for example, coconut oil, fractionated coconut oil, fractionated palm oil, or other vegetable oils. Preferably, the coating composition comprises 30-35% fat. Preferably the coating is completely liquid above 120° F., yet solidifies quickly (less than 3 seconds) after coating onto the frozen yogurt portion. In an embodiment of the present invention, the fat based coating comprises 20-80% of fat that is liquid at 72° F. and 20-80% of fat that is solid at 72° F. The fat based coating preferably exhibits an initial peak force value of 8.5 to 11.5 kg and a maximum peak force value of 9.5 to 14 kg, at 4°

C. The peak force value for the finished, coated piece itself preferably ranges from 1 to 5 kg at 4° C. The fat coating preferably has crystalline melt characteristics of being completely liquid at 30 to 35° C., as measured by DSC. In embodiments with more coconut oil, the onset of melting was at 30° C., but increased to 35° C. with higher palm kernel oil content. Optionally, the first coating may comprise particulate inclusions. Preferably, the first coating does not comprise particulate inclusions because such particulate inclusions may weaken the integrity of the coating, thereby leading to leakage of yogurt from the product after thawing, or to prevent migration of moisture through the coating composition. Thus, preferably the first coating composition is free of any visibly detectable undissolved particulate inclusions, including, for example granola pieces or even cocoa powder.

The coating composition is applied to the frozen yogurt portion by any appropriate technique, such as by dipping the portion in the coating composition or spraying, brushing, or otherwise applying the coating composition to the frozen yogurt portion. Preferably, the coating is applied to form a layer that is from about 1.0 to about 1.5 mm thick. Preferably the coating completely seals the yogurt portion so that yogurt cannot leak out of the final product after thawing. For a yogurt portion that is about 2 cm in diameter and 6 g, the first coat will add about 2 g of weight to the portion, the second coat will add about 5 g more, and the granola will add another 1.5 g.

The coated yogurt composition preferably is coated a second time in optional second coating step 50. The application of a second coating is preferred to provide further integrity and strength to the final product to prevent leakage of yogurt from the product after thawing.

In an embodiment, the second coating composition comprises particulate inclusions, such as pieces of granola, nuts, cookies, grain based particulates (such as cereal, graham, etc), chocolate, hard candy, seeds toffee, caramel, fruit and the like and mixtures thereof. In addition, other nutrients and additives can be incorporated with the particulates for added health benefits.

Preferably, the second coating is applied to form a layer that is from about 1 to about 3 mm thick. In an embodiment of the present invention, the second coating comprises particulate inclusions and is applied to form a layer that is from about 2 to about 3 mm thick, and preferably from about 2 to about 2.5 mm thick.

In an embodiment, the refrigerated yogurt product comprises the above described components in the following percentages by weight: 35-45% yogurt composition, 10-20% first coat, 35-45% second coat and 5-15% particulate inclusions.

It is preferable not to freeze the yogurt portion (i.e. the center of the product) again after the first coating, but to store them refrigerated or to apply a second coat right away. If the centers are refrozen after the first coating, the expansion due to freezing may lead to very small cracks that can disrupt the integrity of the moisture bather.

For better adhesion of the particulate inclusions and to provide more particulate inclusions on product surface, some of the particulate inclusions are stirred in to the second coating prior to dipping the frozen yogurt portion. When the frozen yogurt portion is dipped in the coating, the coating cools and thus begins to solidify. Generally, the coating is mostly solid by the time the yogurt portion is completely coated in particulate inclusions.

Optionally, additional particulates can be added to the outside of the outer coating of the yogurt product by applying particulate inclusions as described above to the unhardened coating material, e.g. by dredging the coated yogurt portion in the particulate inclusions.

The particulate inclusions on the outer surface of the refrigerated yogurt product in particular provide the product with a unique dual texture, as well as facilitating the status of the product as a "finger food" by keeping the consumers fingers dry. Larger particulates can be added to the coating composition itself as part of the second or subsequent coating composition, but the outer particulate coating is preferably of a finer grind for complete coverage of the product. Optionally, different particulates and coating compositions can be applied sequentially to the yogurt product to provide further flavor and texture experiences.

A preferred refrigerated yogurt product of the present invention comprises from about 3 to 7 grams of yogurt and has a first fat-containing coating of from about 1 to about 3 grams, a second fat-containing coating of from about 3 to 7 grams (including particulate inclusions), and an additional outer layer of particulate inclusions of from about 1 to about 3 grams.

The coated yogurt composition is then allowed to thaw (while stored at refrigeration temperature) and is stored at refrigeration temperature in thaw step 60.

The thus prepared product is package for distribution in bulk, in multiple serving packages or as individual product. In an embodiment, the yogurt product is maintained in the frozen state for shipping with instructions for allowing the product to thaw at the point of purchase or consumption and for storage at refrigeration temperatures. Transport and storage in a "wholesale" environment in the frozen state provides advantages in product stability for handling purposes and potential shelf life benefits for an optimal freshness experience at the time of consumption.

EXAMPLES

Representative embodiments of the present invention will now be described with reference to the following examples that illustrate the principles and practice of the present invention.

A. Yogurt Preparation.

The yogurt compositions of the present refrigerated yogurt product are created following this general process:

Milk and other ingredients are blended to mix and hydrate any powders. Then the blend is heated to 160° F., homogenized at 1000 psi, heated to 195° F., held for 9 minutes, and cooled to 110° F. Yogurt culture (*Streptococcus thermophilus* and *Lactobacillus bulgaricus*) is added, as well as any adjunct cultures (such as *Lactobacillus acidophilus, Bifidobacterium bifidus*, etc.), and product is fermented until the pH drops from the natural pH of the milk (about 6.5) to about pH 4.5. Product is then cooled. For strained yogurt, the finished product is separated by mechanical means (centrifugal separator or ultrafiltration) to concentrate the product before it is completely cooled after fermentation.

Representative yogurt compositions are as follows:

An embodiment of the present refrigerated yogurt product has a total solids content of at about 25% and a milk solids content of 41 weight percent based on total solids content and has fat content of 1% and soluble solids content (sucrose and lactose) of 11.5%. The composition additionally comprises starch (3%), gelatin (0.7%) and low methoxy pectin (0.3%). This formula is fermented and used without a concentration step.

In an embodiment of the present invention, the refrigerated yogurt product has a total solids content of 31.5%, with a milk solids content of 57% of the total solids, and soluble solids content of 9%, fat content of 3%. This formula is also fermented and used without a concentration step.)

In a third embodiment, yogurt is prepared and then concentrated after fermentation. This leads to a finished filling (after concentration step having a total solids content of 48%. The milk solids are 37% of the total solids, fat content is 2% and the soluble solids are 12%.

B. Sample Preparation.

Balls or dollops of yogurt having a weight of about 6 grams are placed onto aluminum foil and are frozen to a temperature so that the frozen yogurt portions will retain their shape in an unsupported manner.

A fat based coating composition consisting of 50% sugar, 35% coconut oil and 15% palm kernel oil is heated to 150 F, so that the coating composition is in liquid form. The frozen yogurt portion is dipped into the coating composition to completely coat the portion. The first coating is allowed to set, and a second coating as described below is applied. Preferably, this second coating is applied almost immediately after application of the first coating, which is particularly beneficial in commercial scale production. Alternatively, solidification of the first coating is assisted by chilling the coating such as by placing the coated article in a refrigerator for 5-10 minutes.

A second coating composition is prepared by grinding a granola composition (preferably Cascadian Farms™ Oat & Honey Granola) in food processing machine (Cuisinart™ type machine for two 10 second pulses. Separate grinds on a #8 mesh screen (about one third will be retained on screen). Heat fat based coating composition as above and blend the granola pieces retained on the #8 screen into the coating (22% by weight).

The single coated frozen yogurt portion is dipped into second coating composition to completely coat the single coated frozen yogurt portion. The product is then quickly removed and immediately put into paper boat with finely ground granola, and completely coated in granola.

The thus coated product is placed on a tray and stored in a refrigerator.

C. Testing Protocol.

Viscosity

Unless otherwise indicated (e.g. by designation of temperature), all viscosities are apparent viscosities measured at 25° C. using a Brookfield viscometer with a No. 5 spindle for 25 seconds at 10 rpm.

Coating Hardness

Hardness measurements were made at 4° C. Single pieces were compressed between parallel plates until the coating fractured. The maximum force required to fracture the coatings was recorded in kg units.

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a refrigerated cultured fresh dairy product of small size suitable for eating with the fingers, comprising:
   a) providing a frozen yogurt composition in individual serving portions at a temperature from about −40° F. to about 10° F.;
   b) coating the frozen yogurt portions with a fat based coating that is a solid at 45° F., thereby completely enveloping the frozen yogurt portions; and
   c) allowing the coated frozen yogurt portion to thaw to form a refrigerated yogurt product; and
   d) storing the refrigerated yogurt product at a temperature of from about 32° F. to about 45° F.;
   wherein the yogurt composition of the refrigerated yogurt product either:
   i) has a total solids content of at least about 22% and a final viscosity of from about 35,000 to about 150,000 cP at 4° C.; or
   ii) has a final viscosity of from about 35,000 to about 150,000 cP at 4° C. and exhibits a viscosity reduction at 45° F. of less than 10% after two freeze/thaw cycles.

2. The method of claim 1, wherein the final viscosity of the refrigerated yogurt product is from about 60,000 to about 120,000 cP at 4° C.

3. The method of claim 1, further comprising coating the coated frozen yogurt portions with a second fat based coating prior to allowing the coated frozen yogurt portions to thaw.

4. The method of claim 3, wherein the second fat based coating comprises particulate inclusions.

5. The method of claim 4, wherein the particulate inclusions are selected from the group consisting of pieces of granola, nuts, cookies, grain based particulates, chocolate, hard candy, seeds, toffee, caramel, fruit and mixtures thereof.

6. The method of claim 1, wherein the fat based coating is applied to form a layer that is from about 1.0 to about 1.5 mm thick.

7. The method of claim 1, wherein the yogurt composition of the refrigerated yogurt product has a total solids content of from about 24% to about 35%.

8. The method of claim 1, wherein the yogurt composition of the refrigerated yogurt product comprises at least about 38% milk solids based on total solids content.

9. The method of claim 7, wherein the yogurt composition of the refrigerated yogurt product comprises from about 50% to about 80% milk solids based on total solids content.

10. The method of claim 1, wherein the fat based coating comprises 20-80% of fat that is liquid at 72° F. and 20-80% of fat that is solid at 72° F.

11. The method of claim 1, wherein the fat based coating has crystalline melt characteristics of being completely liquid at 30° C. to 35° C., as measured by DSC.

12. The method of claim 1, wherein the fat based coating has a hardness of from about 9.5 to about 14 kg peak force at 4° C.

13. The method of claim 1, wherein the frozen yogurt portion has a shape selected from a generally spherical shape, a generally cylindrical shape, a generally half-spherical shape, and a generally half-cylindrical shape.

14. The method of claim 1, wherein the frozen yogurt portions are from about 2 to about 12 grams.

15. The method of claim 1, wherein the frozen yogurt portions are formed by freezing yogurt, extruding the yogurt, and separating the yogurt extrudate into individual serving portions.

16. The method of claim 1, wherein the frozen yogurt portions are formed by depositing yogurt individual serving portions onto a surface and freezing the yogurt individual serving portions.

17. The method of claim 1, wherein the frozen yogurt portions are at a temperature of from about −40° F. to about 10° F. when coated with the fat based coating.

18. The method of claim 1, wherein the frozen yogurt portions are at a temperature of from about −35° F. to about −20° F. when coated with the fat based coating.

19. The method of claim 1, wherein the frozen yogurt portions are at a temperature of from about −10° F. to about −15° F. when coated with the fat based coating.

* * * * *